(12) United States Patent
Aarnivuo

(10) Patent No.: US 6,431,928 B1
(45) Date of Patent: Aug. 13, 2002

(54) ARRANGEMENT AND METHOD FOR TURNING A PROPULSION UNIT

(75) Inventor: Jussi Aarnivuo, Helsinki (FI)

(73) Assignee: ABB Azipod Oy, Helsinki (FI)

( * ) Notice: Subject to any disclaimer, the term of this patent is extended or adjusted under 35 U.S.C. 154(b) by 0 days.

(21) Appl. No.: 09/786,356

(22) PCT Filed: Sep. 13, 1999

(86) PCT No.: PCT/FI99/00739

§ 371 (c)(1),
(2), (4) Date: May 3, 2001

(87) PCT Pub. No.: WO00/15495

PCT Pub. Date: Mar. 23, 2000

(30) Foreign Application Priority Data

Sep. 14, 1998 (FI) .................................................. 981971

(51) Int. Cl.[7] .......................... B63H 20/00; B63L 11/00
(52) U.S. Cl. ...................... 440/58; 440/6; 114/144 RE
(58) Field of Search ........................ 114/144 B, 144 E, 114/144 RE; 140/6, 53, 58; 701/21

(56) References Cited

U.S. PATENT DOCUMENTS

| 2,804,838 | A | * | 9/1957 | Moser ............................ 440/7 |
| 2,877,733 | A | * | 3/1959 | Harris ............................ 440/7 |
| 3,187,704 | A | * | 6/1965 | Shatto, Jr. et al. ...... 144/144 B |
| 3,500,025 | A | * | 3/1970 | Moulin et al. ............... 701/116 |
| 3,548,775 | A | * | 12/1970 | Hammond .............. 114/144 B |
| 3,797,448 | A | * | 3/1974 | Cramer ................... 114/144 B |
| 3,976,023 | A | | 8/1976 | Noguchi et al. |
| 4,611,549 | A | | 9/1986 | Kodera et al. |
| 4,614,900 | A | * | 9/1986 | Young .......................... 318/16 |
| 5,361,024 | A | | 11/1994 | Wisner et al. |
| 5,386,368 | A | * | 1/1995 | Knight ........................ 364/432 |
| 5,491,636 | A | * | 2/1996 | Robertson et al. .......... 364/432 |
| 5,816,870 | A | * | 10/1998 | Rubin ............................. 440/6 |

FOREIGN PATENT DOCUMENTS

| EP | 0 035 600 A1 | 9/1981 | |
| FI | 68196 | 4/1985 | |
| FI | 96590 | 4/1996 | |
| JP | 58-209697 | * 12/1983 | ............. 114/144 R |

* cited by examiner

Primary Examiner—S. Joseph Morano
Assistant Examiner—Ajay Vasudeva
(74) Attorney, Agent, or Firm—Arent Fox Kintner Plotkin & Kahn

(57) ABSTRACT

A propeller drive arrangement for moving and steering a vessel traveling in water. The propeller drive arrangement includes an azimuthing propulsion unit, a power supply, a control unit, and a sensor means. An operating means is provided for turning the azimuthing propulsion unit it relation to the hull of the vessel for steering the vessel in accordance with a steering command controlled by the vessel's steering control device. The operating means also includes a second electric motor for turning the azimuthing propulsion unit via a mechanical power transmission that is connected to the second electric motor. The sensor means is connected to the control unit and used for detecting the rotational position of the azimuthing propulsion unit. The control unit is configured so that both the steering command information originating from the steering control device and the rotational position information originating from the sensor means can be processed.

16 Claims, 4 Drawing Sheets

ARRANGEMENT AND METHOD FOR TURNING A PROPULSION UNIT

THE FIELD OF THE INVENTION

Figure 1:
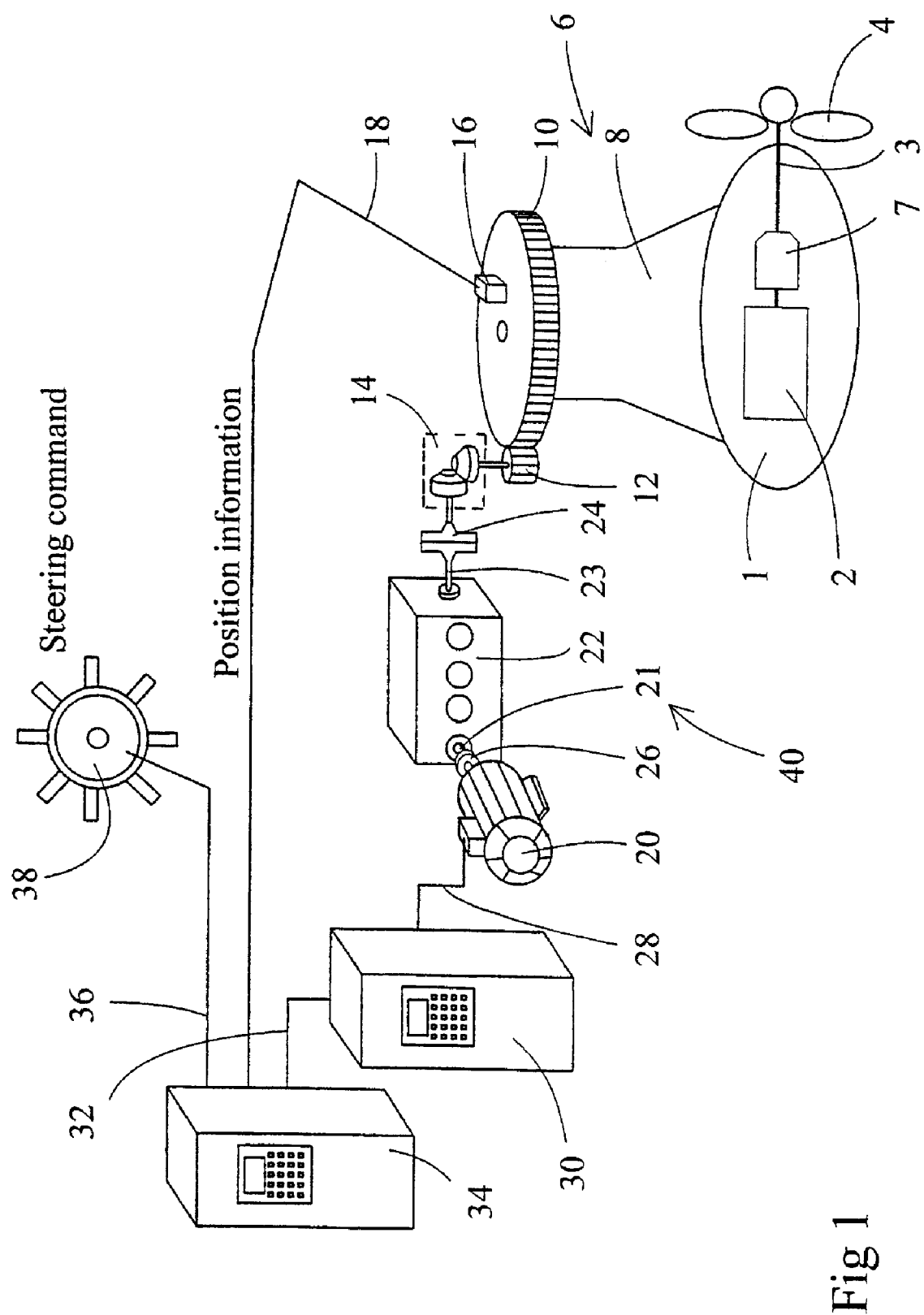

The invention relates to a propeller drive arrangement for vessels used in water transport, and in particular to an arrangement which incorporates a propulsion unit which can be turned in relation to the hull of the vessel. The present invention also relates to a method for moving and steering a vessel travelling on water.

THE BACKGROUND TO THE INVENTION

In most cases, various ships or the like vessels (such as passenger ships and ferries, cargo vessels, lighters, oil tankers, ice-breakers, off-shore vessels, military vessels etc.) are moved by means of the propulsion or draw created by a rotatable propeller or several propellers. Vessels have been steered using separate rudder gear.

Traditionally, propeller operating, i.e., rotation arrangements have involved a propeller shaft drive, such as a diesel, gas or electric engine, being positioned inside the hull of the vessel, from where the propeller shaft has been taken via a duct sealed to make it watertight to outside the hull of the vessel. The propeller itself is located at the other end, i.e., the end extending outside the vessel, of the propeller shaft which is connected either directly to the engine or to a possible gearing. This solution is employed in the majority of all the vessels used in water transport in order to obtain the force required for movement.

Recently, one have also arranged for fitting vessels with propeller units in which the equipment (usually an electric motor) creating the propulsion power for the propeller shaft and any gearing are positioned outside the hull of the vessel within a special chamber or pod supported for rotating in relation to the hull. This unit can be turned in relation to the hull, which means that it can also be used for steering the vessel instead of separate rudder gear. More precisely, the pod containing the engine is supported by means of a special tubular or the like shaft to rotate in relation to the hull of the ship, which tubular shaft has been arranged through the bottom of the ship. This kind of propulsion unit is disclosed in greater detail in, inter alia, the Applicant's FI Patent No. 76977. These units are also referred to generally as azimuthing propulsion units, and, e.g., the applicant in the present application provides azimuthing units of this kind under the trademark AZIPOD.

Besides the advantages obtained by the omitting of a long propeller shaft and separate rudder gear, this equipment has also been found to achieve a fundamental improvement in the vessel's steerability. The vessel's energy economy has also been found to improve. The use of azimuthing propulsion units in a variety of vessels designed for water transport has in fact become more common over the last few years, and it is assumed that their popularity will continue to grow.

In known solutions, the azimuthing propulsion unit's turning arrangement has generally been implemented so that a geared tiller ring or the like tiller rim has been attached to the tubular shaft which forms the unit's swivelling axis, which tiller is rotated with the aid of hydraulic engines adapted to co-operate with it. The turning movement of the tiller is also halted and kept in the halted position whenever no steering movements are performed by means of the same hydraulic engines. For this reason, there is always normal operating pressure in the hydraulic system, also when the vessel runs straight.

In accordance with one known solution, four hydraulic engines have been positioned in connection with the turning rim. The operating machinery which creates the hydraulic pressure required in the engines comprises of a hydraulic pump and of an electric motor which rotates it. In order to enhance the service reliability of the turning gear, the hydraulic engines can be arranged in two separate hydraulic circuits, each of which has its own operating machinery to create the hydraulic pressure.

A hydraulic turning system has been employed, inter alia, because hydraulics readily allow the relatively high torque required for turning an azimuthing propulsion unit to be obtained at a relatively low speed of rotation. At the same time, the turning and steering of the vessel by means of the hydraulics can be readily and relatively precisely controlled with the aid of traditional valve gears and corresponding hydraulic components. As was already stated earlier, one feature obtained with a hydraulic system has been the fact that it enables the turning movement of the propulsion unit's shaft to be halted quickly and precisely in the desired position. This position can then be maintained, something which has been regarded as quite essential for the steering of the vessel.

SUMMARY OF THE INVENTION

However, a number of problems and deficiencies have been observed in the known hydraulic solution, which is as such found to be effective and reliable. In order to implement the turning system, the vessels have to be fitted with an expensive and complicated separate hydraulic system incorporating a large variety of components despite the fact that the rotation of the propeller itself is performed by means of an electric motor. This means, inter alia, that some of the benefit in efficiency of the use of space, obtained with the outboard azimuthing propulsion unit, is lost. Hydraulic systems also require regular and relatively frequent maintenance and inspections, which give rise to costs, and may even call for the vessel to be withdrawn from service for the duration of the maintenance work. Another deficiency of the hydraulic systems has been the fact that they have a known tendency to leak/drip oil or similar hydraulic fluid into their surroundings, in particular from hose pipes and various joints and sealing surfaces. Apart from the costs arising from the leakage and consumption of hydraulic fluid, this also causes an environmental and cleanliness problem. Leaks also cause a considerable safety risk, since surfaces stained by hydraulic fluid become slippery and thereby dangerous, and leaked hydraulic fluid may also constitute a fire risk. The hydraulic system's internal pressure is relatively high, and thereby, e.g., a leak in a hose pipe may cause a high-pressure and often aciform (needle-shaped) jet of oil, which may cause serious injuries if it impacts with operating personnel. While it is running, the hydraulic system is also noisy, and this affects, inter alia, the operating personnel's working conditions. The noise is continuous, since the system should be on all the time when the vessel is moving. Further, the hydraulic system achieves only a constant-speed turning movement (i.e., single-speed) for the propulsion unit. However, there are situations where a possibility for at least one other turning speed would be desirable.

The purpose of the present invention is to eliminate the deficiencies of the known technology and create a new kind of solution for turning an azimuthing propulsion unit in relation to the hull of a vessel.

One objective of the present invention is to achieve a solution which avoids the use of a separate hydraulic system and the associated problems in the turning of an azimuthing propulsion unit.

One objective of the present invention is to achieve a solution which improves the reliability and overall economy of an azimuthing propulsion unit's turning machinery compared to the known solutions.

One objective of the present invention is to obtain a solution which reduces the noise level of an azimuthing propulsion unit's turning machinery compared to the known solutions.

One objective of the present invention is to achieve a solution which allows the turning speed of an azimuthing propulsion unit to be altered and/or adjusted.

Another objective of the present invention is to obtain a solution which reduces the environmental risk caused by the turning machinery and improves its general level of cleanliness and safety compared to known solutions.

The invention is based on the basic insight that an azimuth propulsion unit is rotated by a direct electric drive which is controlled by a control unit that is adapted to deal with both steering commands issued for the vessel and position information provided by a sensor device which detects the position of the azimuthing propulsion unit. The operation of the electric motor is controlled by controlling the electric motor's power supply unit using the control unit on the basis of this processing.

More precisely, the arrangement according to the present invention is characterized in particular by what is disclosed in the characterizing section of the enclosed independent claim 1. The method according to the present invention is characterized by what is disclosed in the characterizing section in the enclosed independent claim 6.

In accordance with one advantageous embodiment of the invention, the power transmission equipment which turns the azimuthing propulsion unit comprises a gear rim fitted to the shaft unit, a pinion gear, a worm, or the like adapted to co-operate with said gear rim, which gear wheel is rotated via a reduction gearing connected to an electric motor. Favorably, the equipment further comprises a suitable brake means for halting the turning of the azimuthing propulsion unit and maintaining the halted position and a functional connection between said brake means and said control unit for transferring control commands for said brake means. In accordance with one preferred embodiment the speed of rotation of the electric motor is regulated by means of an AC inverter drive.

The present invention provides several significant benefits. By means of the invention it is possible to replace the known arrangement based on the use of hydraulics, and thus the aforesaid problems associated with the use of hydraulics can be eliminated. The overall economy of a solution based on the use of an electric motor is good, and the maintenance requirement almost nonexistent. A turning system based on an electric drive is also highly reliable. In modern vessels, electricity is readily available and is employed in a number of different places (also the azimuthing propulsion unit incorporates an electric motor), and so the construction of a separate (expensive) hydraulic system is avoided. An electric drive can be used to achieve a turning arrangement with adjustable speeds for the azimuthing propulsion unit.

The present invention and its other aspects and benefits are described in greater detail in the following exemplary presentation and referring also to the attached drawing in which corresponding reference numbers in the separate Figures refer to corresponding features.

A BRIEF EXPLANATION OF THE DRAWINGS

Figure 2:
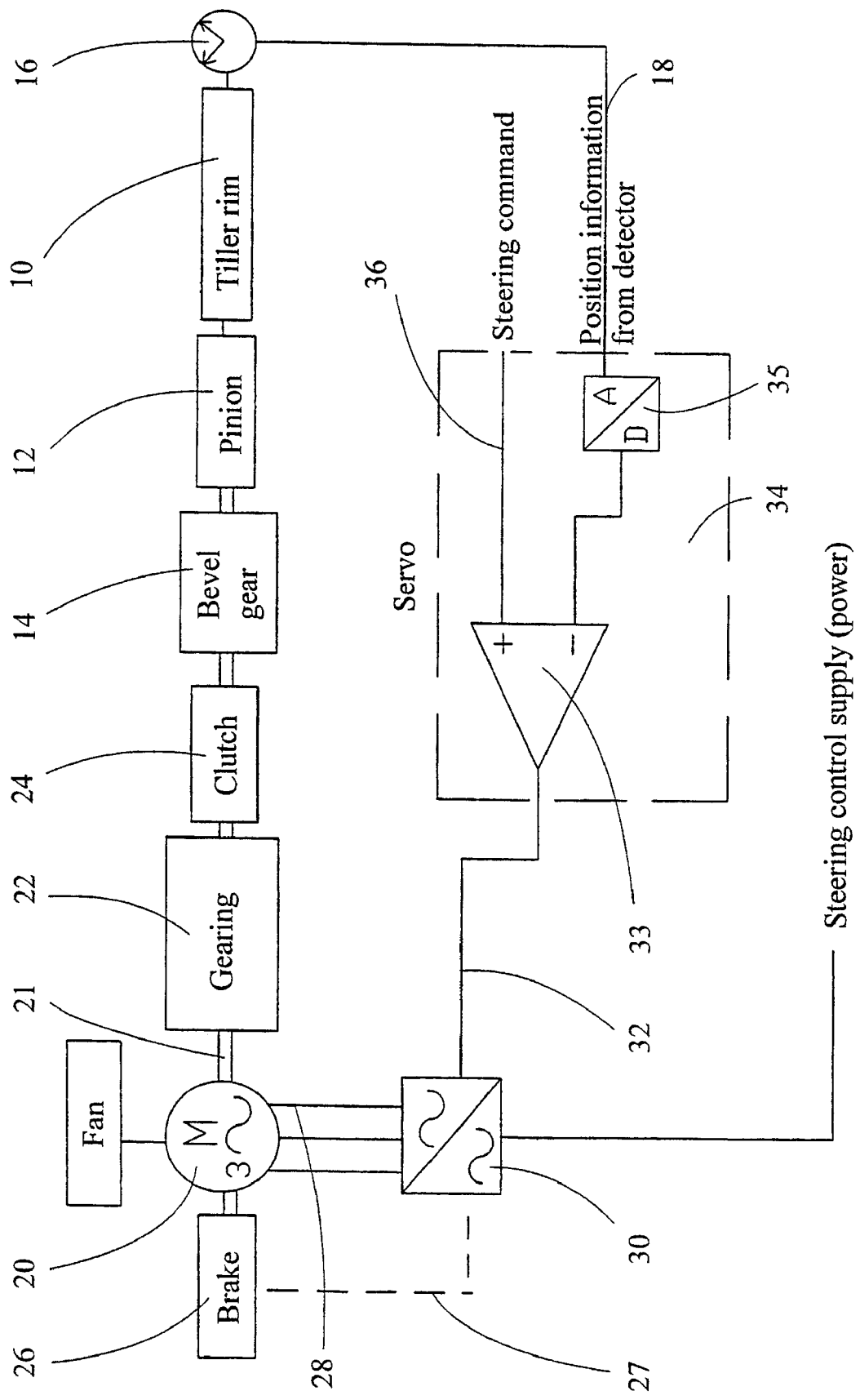
Figure 3:
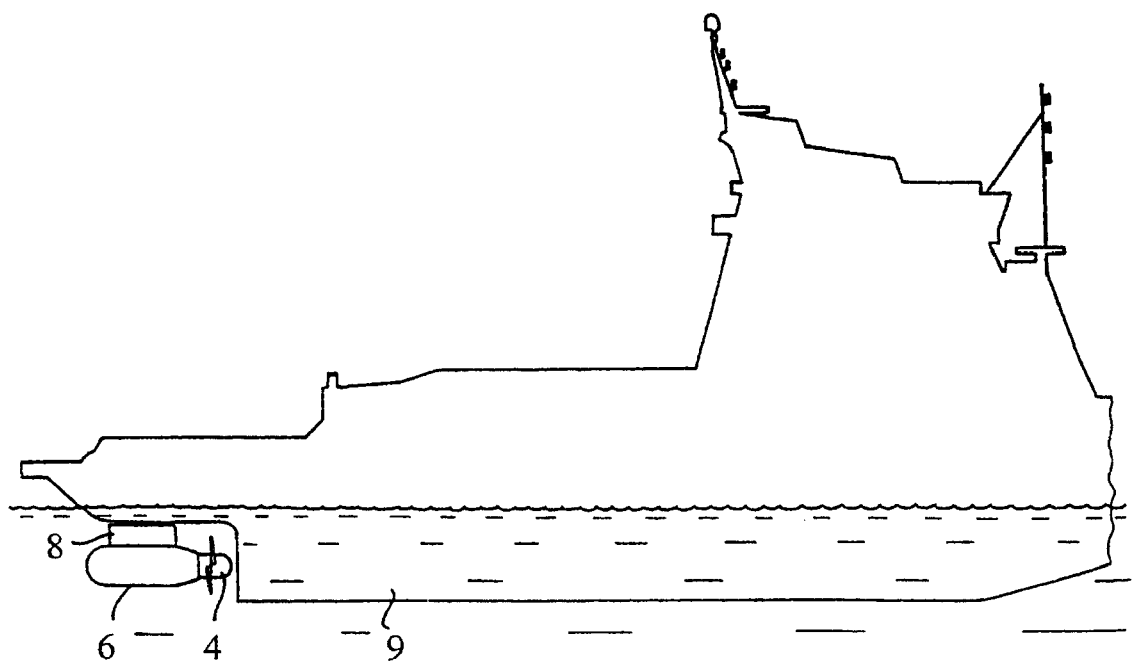
Figure 4:
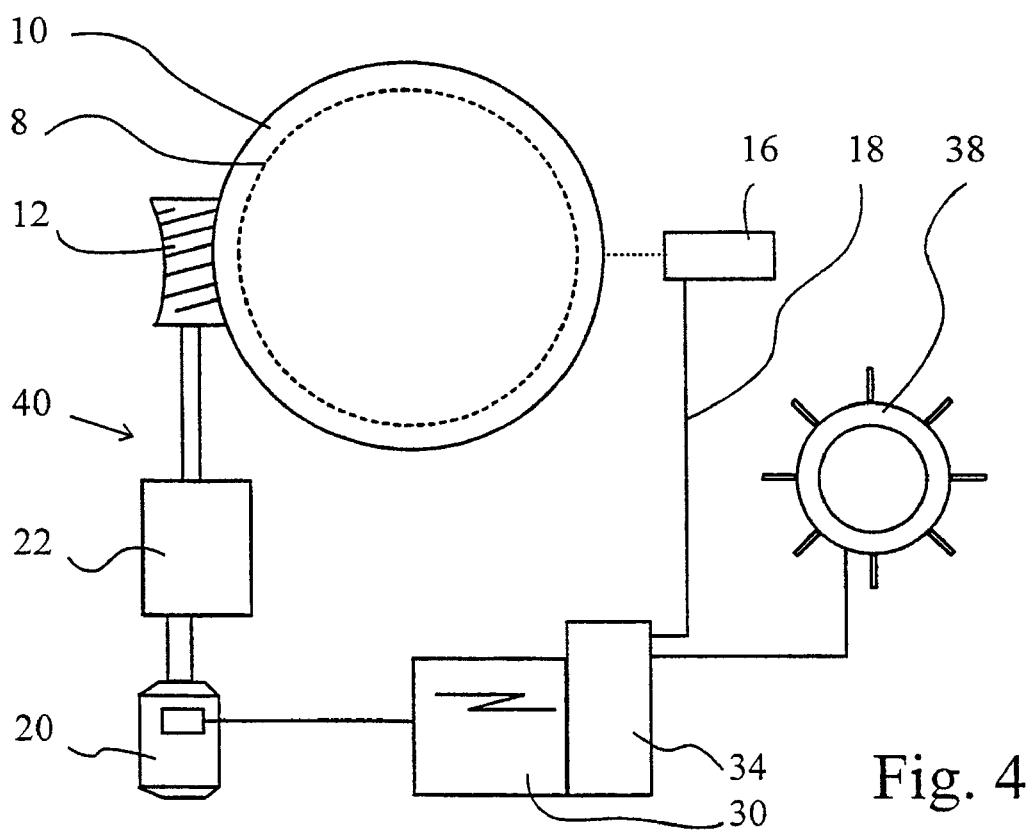
Figure 5:
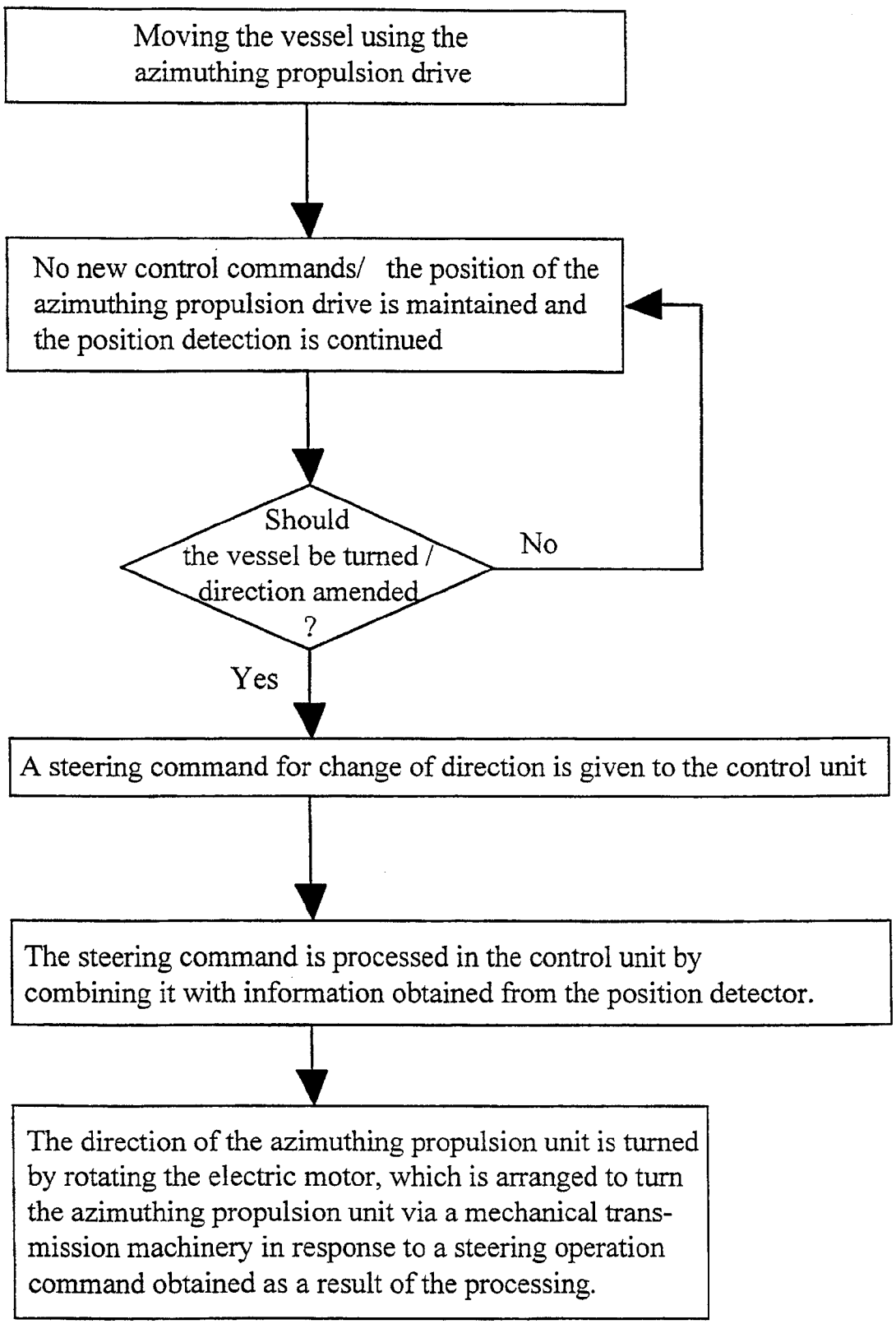

FIG. 1 shows a simplified diagrammatic visualization of one embodiment of the present invention, FIG. 2 shows a block diagram for the arrangement according to FIG. 1, FIG. 3 shows a propeller unit installed in a ship, FIG. 4 shows turning equipment according to one alternative in the form of a diagrammatic visualization, and FIG. 5 shows a flow diagram for the operation of the turning arrangement according to the invention.

A DETAILED EXPLANATION OF THE DRAWINGS

FIG. 1 discloses in the form of a diagrammatic plan in principle and FIG. 2 in the form of a block diagram one embodiment of a turning machinery according to the present invention. FIG. 3 discloses an azimuthing propulsion unit 6 installed in a vessel 9. More precisely, FIG. 1 discloses a azimuthing propulsion unit 6, which comprises a watertight pod 1. Installed inside said pod 1 is an electric motor 2, which can be any kind of known electric motor structure. Said electric motor 2 is connected via a shaft 3 to a propeller 4 in a manner known per se.

According to one alternative, the structure can be fitted with a gear in said pod 1 between said electric motor 2 and said propeller 4. In accordance with one alternative, there is more than one propeller for each pod. In that case, there can be, e.g., two propellers, one at the front of the pod and one at the rear.

Said pod 1 is supported, for rotation around the vertical axis, at the hull of the vessel (the hull is not shown, see e.g., FIG. 3) by means of an essentially vertical shaft means 8 (the bearings are not shown in the Figure, one alternative for this is shown, e.g., in the cited FI Patent 76977, which is included herein by reference). Said shaft means 8 (e.g., a hollow tubular shaft) can, e.g., have a diameter which allows for maintenance of the motor located down in the pod, a possible gearing and the propeller shaft.

A 360° gear rim 10 or a corresponding tiller rim is connected to said shaft means 8 for transferring, to said shaft means 8, the power required for turning the shaft means n relation to the hull of the vessel. When the shaft means 8 is turned, said azimuth propulsion unit 8 turns correspondingly. In the FIG. 1 case, a turning machinery 40 for said gear rim 10 comprises a pinion gear 12, a bevel gear 14, a switch 24 a gearing 22 and an electric motor 20, and the shafts between these. Also shown is a brake means arranged at said shaft 21, which means in this case consists of a disc brake 26 and drive equipment required therefore. It should be observed that not all the aforesaid elements are necessary in the turning machinery for implementing the present invention but that some of them can be omitted or replaced with other elements.

The driving power for electric motor 20 is fed from an AC inverter 30, which acts as the power source, via a conductor 28. The operating principle of the AC inverter is a technology known to a person skilled in the art, and so there is no need to explain it here apart from stating that the general main components of the AC inverter are a rectifier, a direct voltage intermediate circuit and a inverter rectifier (=inverter component). AC inverters are generally used nowadays, inter alia, as input devices for alternating-current motors, and they are particularly advantageous in various controllable electrical drives. The most commonly employed AC inverters include PWM inverters based on pulse width modulation and fitted with a voltage intermediate circuit.

An AC inverter is advantageous to use, inter ali , because it provides a regulation of the rotational speed of a said turning machinery 40 and thereby of the rotational speed of said shaft 8. In accordance with one solution, there are at least two different speeds in use. In accordance with another solution, the rotational speed can be regulated within a predefined speed range, such as from 0 to the nominal speed of rotation.

The operation of said AC inverter 30 is controlled by a control unit 34 (such as servo steering) via a connection 32. Said control unit 34 is in turn connected functionally to a steering control device located on the bridge or in a similar position, such as a helm wheel 38, which is use to issue the actual steering commands for the vessel. Steering commands issued manually using the helm are converted, e.g., by means of a separate analogue servo means into course commands. According to another solution, the steering commands are converted using a transformer connected to the wheel into digital steering signals, which are sent via a connection 36 to the control unit.

Said control unit 34 uses the steering command information given by the helm 38 to control the AC inverter 30, which in turn supplies current to the motor 20, whose desired (course, speed) rotation clock- or anti-clockwise generate the desired change in the turning angle of said shaft 8 and thereby of the propulsion unit 6.

Control unit 34 can be any kind of suitable data-processing device and/or control device such as a microprocessor, a servo steering means (such as a so-called analogue servo) or a corresponding device which is able to perform the processing of steering commands and other information affecting the steering and presented later, and to control the AC inverter or similar power unit on the basis of this processing.

FIGS. 1 and 2 also show a position or angle sensor 16 arranged in connection with the azimuthing propulsion unit 6 (here on top of gear rim 10) to detect the turning angle of said shaft 8. Various position sensors suitable or this purpose are known per se, and said position sensor 16 can be based, e.g., on a photo-optic sensor, a so-called sin/cos sensor or on a sensor based on machine or computer vision systems which defines the turning angle. It should be observed that the type of sensor 16 has no fundamental effect on the implementation of the invention, but that what essential is to define the direction of the azimuthing propulsion unit reliably by means of the sensor device used.

Position sensor 16 has a functional connection 18 to control unit 34 for the purpose of transmitting position signals. Said connection 18 can be, e.g., a cable connection or a radio link. The arrangement can also comprise an analogue/digital (A/D) converter 35 for converting an analogue position signal from sensor 16 into a digital format which can be processed by said control unit 34, if the control unit used requires such conversion.

Control unit 34 is arranged to combine, in a processor or the like processing device 33, the information it has received from said position sensor 16 with the steering commands obtained from said steering control device 38, and to control the operation of said AC inverter 30 or the like power supply unit on the basis of this processing, as shown in FIG. 2.

FIGS. 1 and 2 also show said brake means 26, as presented above. It is arranged to halt the turning movement of the propulsion unit in a desired position and to old the propulsion unit in a fixed position whenever no steering commands have been issued. The operation of said brake means 26 (such as the timing and force of braking and holding) can be controlled via the functional connection by means of the control unit which controls the operation of the system. According to the favorable solution shown in FIG. 2 the operation of said brake means 26 is controlled by said AC inverter 30, which in turn receives the steering commands from control unit 34. The braking arrangement also allows the information originating from position sensor 16 to be utilized in the control of the braking, so that the direction of the propeller, i.e., of the propulsion force which moves the vessel, can be adjusted to precisely correct.

The brake means can be implemented, e.g., in the form of a mechanical friction brake (such as disc or drum brakes, brake shoes) or of a magnetic brake, which can be positioned in a suitable part of the power transmission equipment 40, or even directly to brake/hold said shaft means 8 of the propulsion unit 6. In accordance with one alternative, said gearing 22 or the cogging affecting said gear rim 10 is selected so that it brakes against the rotating movement emanating from the propeller unit 6, but allows a rotation emanating from said motor 20, i.e., it is of a type which allows turning power from only one direction to be carried forward.

Yet another possibility is to use said electric motor 20 for braking/holding. In this case, the output of the motor 20 is controlled, e.g., using said AC inverter 30 and said control unit 34 so that the desired braking/holding effect is obtained in a desired and controlled manner. By means of the electric motor 20 a either full braking/holding can be obtained or it can be used to generate only some of the required braking power, in which case the braking is completed by means of a separate brake means. In accordance with this embodiment it is possible to lighten/reduce the braking force required from a mechanical brake in the braking. In accordance with one solution, said electric motor 20 is used during braking as a generator, and the electrical energy thereby generated during the braking is fed into the electricity network. The electricity network is advantageously the same as the one from which the electric machine in the turning system 40 takes its operating power when it functions as an electric motor.

FIG. 4 shows a solution which aims for the most compact and simple structure possible. In accordance with FIG. 4, said turning gear rim 10 is rotated by means of a worm 12 connected directly to said gearing 22. However, in this connection, attention is drawn to the point that although the solutions in FIGS. 1 and 4 show a gear rim 10 and a co-operating rotating means 12, the use of a gear rim is not always necessary and it can also be replaced with another solution which permits power transmission to the shaft unit 8 of said propulsion unit 6. A solution of this kind is, e.g., a rim motor, which means an electric motor having an essentially large stator coil arranged at the rim of said shaft 8. In this case, the power transmission machinery is considered to consist of any means transferring the power from said motor to said shaft 8.

FIG. 4 also shows a sensor solution which employs non-contacting sensor 16 installed near to but, nonetheless, separately from the propulsion unit's shaft means. Said sensor 16 detects position markings arranged around the shaft unit, and produces a position signal on the basis of this detected information.

FIG. 5 shows a flow diagram for the operation of a turning equipment according to the present invention. In accordance with the principles of the invention, the vessel is moved by means of the azimuthing propulsion unit. The position of the azimuthing propulsion unit is detected by means of a sensor device. The information provided by the sensor device can be utilized in either analogue format or it can if necessary be converted into digital format. Unless a new command has been issued for altering the course, the position of the azimuthing propulsion unit is kept in the most recent position issued from the bridge. If the observation of position information indicates a need to correct the position (deviation from course given, brake slipped or other similar reason), this can be performed automatically.

When the vessel has to be turned, the corresponding command is issued to the control unit. The command is processed in a pre-defined manner in the control unit, also utilizing the latest position information obtained from the sensor. After said processing, the control unit issues a command to the azimuthing propulsion unit's turning machinery, which comprises said electric motor. The electric motor is controlled by controlling the operation of the power source, such as an inverter, after which the desired rotation of the electric motor causes the azimuthing propulsion unit to turn as required via the mechanical transmission of the turning machinery, and the vessel alters its course correspondingly.

Thus, the present invention provides a device and method which provide a new kind of solution for steering a vessel fitted with an azimuthing propulsion unit. The solution avoids a number of the deficiencies in the prior art and brings the benefit of a simpler structure, better overall economy, and operating comfort and safety. It should be observed that the above exemplifying embodiments of the present invention do not restrict the scope of protection for the invention as disclosed in the claims, but that the claims are intended to cover all adaptations, equivalences and alternatives which fall within the invention's spirit and scope as defined in the appended claims.

What is claimed is:

1. A propeller drive arrangement for moving and steering a vessel traveling in water, which arrangement comprises:
   an azimuthing propulsion unit (6), which comprises a pod (1) positionable outside said vessel below sea level, a first electric motor (2) positioned inside said pod, for rotating a propeller (5) connected to said pod, and a shaft means (8) connected to said pod for supporting said pod in a rotatable manner from a hull of said vessel (9),
   operating means for turning said azimuthing propulsion unit (6) in relation to said hull of said vessel (9) for steering said vessel in accordance with a steering command originating from a vessel's steering control device (38),
   characterized in that said operating means comprises a second electric motor (20) for turning said azimuthing propulsion unit (6) via a mechanical power transmission equipment (40) connected to said second electric motor, the arrangement further comprising
   a power supply unit (30) for supplying electric power to said second electric motor (20),
   a control unit (34) for controlling the operation of said second electric motor by controlling said power supply unit (30),
   a sensor means (16) functionally connected (18) to said control unit (34) for detecting the rotational position of said azimuthing propulsion unit (6),
   said control unit (34) being, arranged for processing both a steering command information originating from said steering control device (38) and rotational position information originating from said sensor means (16) and to control the operation of the second electric motor (2) on the basis of said processing.

2. A propeller drive arrangement as defined in claim 1, characterized in that a power transmission equipment comprises a 360° gear rim (10) arranged at said shaft means, a pinion gear or worm arrangement (12) arranged for co-operation with said gear rim, and a gearing (22) arranged between said arrangement and said second electric motor (20).

3. A propeller drive arrangement as defined in claim 1, characterized in that said power supply unit (30) comprises an AC inverter.

4. A propeller drive arrangement as defined in claim 3, characterized in that it comprises a brake means (26), and a functional connection between said brake means and said AC inverter for transferring control commands to the brake means (26).

5. A propeller drive arrangement as defined in claim 4, characterized in that said brake means is a brake distinct from said second electric motor.

6. A propeller drive arrangement as defined in claim 5, wherein the brake means is a friction brake.

7. A propeller drive arrangement as defined in claim 5, wherein the brake means is a magnetic brake.

8. A method for moving and steering a vessel traveling in water, in which method
   said vessel (9) is moved using an azimuthing propulsion unit (6) comprising a pod (1) positioned outside said vessel below sea level, a first electric motor (2) positioned within said pod for rotating a propeller (4) arranged at said pod, and a shaft unit (8) connected to said pod for supporting, in a rotatable manner, said pod to the hull of said vessel (9),
   said azimuthing propulsion unit (6) is turned in relation to said hull of said vessel (9) for steering the vessel in accordance with a steering command given by the vessel's steering control device (38), characterized in
   detecting a rotational position of the azimuthing propulsion unit (6) by means of a sensor means (16) connected functionally (18) to a control unit (34),
   processing, in said control unit (34), steering command information from said control device (38) and rotational position information from said sensor means (16), turning said azimuthing propulsion unit (6) by means of a mechanical power transmission machinery connected to a second electric motor (20) on the basis of said processing performed in said control unit (34), and supplying electric power to said second electric motor (20) in response to said processing performed by said control unit (34).

9. A method as defined in patent claim 8, characterized in turning said azimuthing propulsion unit (6) by means of a joint operation of a 360° gear rim (10), a pinion gear or a worm arrangement (12) arranged to co-operate with said gear rim and a gearing (22) arranged between said arrangement and said second electric motor (20).

10. A method as defined in claim 8, characterized in supplying electric power for said second electric motor via an AC inverter, and regulating, in a required manner, a turning speed of said azimuthing propulsion unit (6) by a corresponding regulation of the electric supply provided by said AC inverter.

11. A method as defined in claim 10, characterized in halting the rotation of said azimuthing propulsion unit (6) by means of a brake device (26) controlled by said AC inverter (30).

12. A method as defined in claim 10, characterized in maintaining the turning position of said azimuthing propulsion unit (6) by means of a brake device (26) controlled by an AC inverter (30).

13. A method as defined in claim 8, characterized in processing said steering command and said position information in said control unit by means of a data-processing device.

14. A method as defined in claim 13, wherein the data-processing device is a microprocessor.

15. A method as defined in claim 13, wherein the data-processing device is a power control unit.

16. A method as defined in claim 8, characterized in braking the rotation of said azimuthing unit by means of an electric generator, and feeding the electric energy generated into the electricity network.

* * * * *